(12) United States Patent
Dede et al.

(10) Patent No.: US 11,573,877 B2
(45) Date of Patent: Feb. 7, 2023

(54) DISTRIBUTED ARCHITECTURE FOR FAULT MONITORING

(71) Applicants: Toyota Motor Engineering & Manufacturing North America, Inc., Plano, TX (US); University of Connecticut, Storrs, CT (US)

(72) Inventors: Ercan M. Dede, Ann Arbor, MI (US); Shailesh N. Joshi, Ann Arbor, MI (US); Lingyi Zhang, Willington, CT (US); Weiqiang Chen, Willington, CT (US); Krishna Pattipatti, Storrs, CT (US); Ali M. Bazzi, South Windsor, CT (US)

(73) Assignees: Toyota Motor Engineering & Manufacturing North America, Inc., Plano, TX (US); University of Connecticut, Storrs, CT (US)

( * ) Notice: Subject to any disclaimer, the term of this patent is extended or adjusted under 35 U.S.C. 154(b) by 0 days.

(21) Appl. No.: 17/378,230

(22) Filed: Jul. 16, 2021

(65) Prior Publication Data

US 2021/0342244 A1    Nov. 4, 2021

Related U.S. Application Data

(63) Continuation of application No. 15/916,943, filed on Mar. 9, 2018, now Pat. No. 11,113,168.

(51) Int. Cl.
*G06F 11/00* (2006.01)
*G06F 11/30* (2006.01)
(Continued)

(52) U.S. Cl.
CPC ...... *G06F 11/3062* (2013.01); *G06F 11/0706* (2013.01); *G06F 17/18* (2013.01); *G06N 20/00* (2019.01); *H04W 4/38* (2018.02)

(58) Field of Classification Search
CPC .. G06F 11/3062; G06F 11/0706; G06F 17/18; H04W 4/38
See application file for complete search history.

(56) References Cited

U.S. PATENT DOCUMENTS

| | | | |
|---|---|---|---|
| 6,687,637 B2 * | 2/2004 | Garabedian | G05B 9/02 706/26 |
| 7,096,159 B2 * | 8/2006 | Cataltepe | G05B 17/02 700/110 |

(Continued)

FOREIGN PATENT DOCUMENTS

| | | |
|---|---|---|
| CN | 104778337 A | 7/2015 |
| CN | 105675038 A | 6/2016 |
| CN | 106169001 A | 11/2016 |

OTHER PUBLICATIONS

Lasheras et al., A Hybrid PCA-CART-MARS-Based Prognostic Approach of the Remaining Useful Life for Aircraft Engines, PMCID: PMC4435117, retrieved from https://www.ncbi.nlm.nih.gov/pmc/articles/PMC4435117/, Mar. 23, 2015, Basel, Switzerland.

(Continued)

*Primary Examiner* — Loan L. T. Truong
(74) *Attorney, Agent, or Firm* — Dinsmore & Shohl LLP

(57) ABSTRACT

Systems and methods for detecting an anomaly in a power semiconductor device are disclosed. A system includes a server computing device and one or more local components communicatively coupled to the server computing device. Each local component includes sensors positioned adjacent to the power semiconductor device for sensing properties thereof. Each local component receives data corresponding to one or more sensed properties of the power semiconductor device from the sensors and transmits the data to the server computing device. The server computing device utilizes the data, via a machine learning algorithm, to generate a set of eigenvalues and associated eigenvectors (Continued)

and select a selected set of eigenvalues and associated eigenvectors. Each local component conducts a statistical analysis of the selected set of eigenvalues and associated eigenvectors to determine that the data is indicative of the anomaly.

20 Claims, 8 Drawing Sheets

(51) Int. Cl.
  *H04W 4/38* (2018.01)
  *G06F 17/18* (2006.01)
  *G06F 11/07* (2006.01)
  *G06N 20/00* (2019.01)

(56) References Cited

U.S. PATENT DOCUMENTS

| | | | |
|---|---|---|---|
| 7,702,435 B2* | 4/2010 | Pereira | H04L 41/147 |
| | | | 701/30.8 |
| 7,768,254 B1* | 8/2010 | Michael | G06F 1/28 |
| | | | 324/142 |
| 8,341,106 B1* | 12/2012 | Scolnicov | G01F 1/50 |
| | | | 702/50 |
| 8,600,685 B2 | 12/2013 | Kalgren et al. | |
| 9,194,376 B2 | 11/2015 | Ritter et al. | |
| 9,489,340 B2 | 11/2016 | Safa-Bakhsh et al. | |
| 9,719,866 B2* | 8/2017 | Kobayashi | G01K 15/007 |
| 11,113,168 B2* | 9/2021 | Dede | H04W 4/38 |
| 2005/0273277 A1 | 12/2005 | Ridnour et al. | |
| 2006/0006997 A1* | 1/2006 | Rose-Pehrsson | G08B 31/00 |
| | | | 340/522 |
| 2007/0090927 A1* | 4/2007 | Potyrailo | G01N 27/3275 |
| | | | 340/10.41 |
| 2008/0270162 A1* | 10/2008 | Machacek | G05B 23/0221 |
| | | | 702/182 |
| 2011/0035094 A1* | 2/2011 | Van Den Berg | G05B 23/0251 |
| | | | 701/31.4 |
| 2012/0200291 A1* | 8/2012 | Carpenter | G01R 33/02 |
| | | | 324/252 |
| 2015/0317475 A1* | 11/2015 | Aguayo Gonzalez | |
| | | | G06F 21/755 |
| | | | 726/23 |
| 2017/0109222 A1* | 4/2017 | Singh | G06F 11/0709 |
| 2017/0365155 A1* | 12/2017 | Borutta | G06K 9/6247 |
| 2018/0120362 A1* | 5/2018 | Viegas | G01R 15/18 |
| 2020/0204884 A1* | 6/2020 | Lin | H04Q 9/00 |

OTHER PUBLICATIONS

Davis et al., Predictive & Prognostic Controller for Wide Band Gap (Silicon Carbide) Power Conversion, Aerospace Conference, 2007 IEEE, retrieved from http://ieeexplore.ieee.org/document/4161659/, Jun. 18, 2007, ISSN: 1095-323X, IEEE, US.

Fusco et al., An Approach to Design a Prognostic Based Maintenance Strategy for Railway Power Converter Unit, Electrical Systems for Aircraft, Railway, Ship Propulsion and Road Vehicles (ESARS), 2015 International Conference, retrieved from http://ieeexplore.ieee.org/document/7101501/ IEEE Xplore: May 7, 2015, ISSN: 2165-9427, IEEE, Aachen, Germany.

Non-Final Office Action issued in corresponding U.S. Appl. No. 15/916,943, dated Aug. 6, 2019.

Final Office Action issued in corresponding U.S. Appl. No. 15/916,943, dated Feb. 12, 2020.

Non-Final Office Action issued in corresponding U.S. Appl. No. 15/916,943, dated Oct. 6, 2020.

Notice of Allowance issued in corresponding U.S. Appl. No. 15/916,943, dated Apr. 20, 2021.

* cited by examiner

DISTRIBUTED ARCHITECTURE FOR FAULT MONITORING

CROSS-REFERENCE TO RELATED APPLICATION

The present application is a continuation of and claims priority to U.S. patent application Ser. No. 15/916,943, filed Mar. 9, 2018 and entitled "DISTRIBUTED ARCHITECTURE FOR FAULT MONITORING," which is incorporated by reference herein in its entirety.

BACKGROUND

Field

The present specification generally relates to systems and methods for monitoring power semiconductor devices and, more particularly, to distributing monitoring tasks between local and remote systems.

Technical Background

Power electronics modules are increasingly operating at higher temperatures and power densities and are typically subject to large variations in the ambient temperature range, number of power cycles, and hence frequency and range of thermal cycling. Existing sensors output data that includes module current, voltage, and device temperature, which is used to estimate anomalies such as bond wire failure, die attach failure, substrate delamination, and/or the like.

The processing power that is necessary to estimate anomalies from the sensor data may generally be too great for certain local devices, such as vehicle-installed processing systems. As such, when it is necessary to use a great deal of processing power, such tasks may be assigned to remote computing devices, such as cloud-based servers and the like. However, the amount of time needed to transmit sensor data from the vehicle to a remote computing device, have the remote computing device process the data, and transmit the processed data back to the vehicle is too long to be completed in substantially real-time such that anomalies can be estimated and addressed before an issue occurs.

SUMMARY

In one embodiment, a distributed architecture system for detecting an anomaly in a power semiconductor device includes a server computing device and one or more local components communicatively coupled to the server computing device. Each one of the one or more local components includes one or more sensors positioned adjacent to the power semiconductor device for sensing one or more properties of the power semiconductor device. Each one of the one or more local components receives data corresponding to one or more sensed properties of the power semiconductor device from the one or more sensors and transmits the data to the server computing device. The server computing device utilizes the data, via one or more of a machine learning algorithm, a fault diagnostic algorithm, and a fault prognostic algorithm, to generate a set of eigenvalues and associated eigenvectors and select a selected set of eigenvalues and associated eigenvectors, and each one of the one or more local components conducts a statistical analysis of the selected set of eigenvalues and associated eigenvectors to determine that the data is indicative of the anomaly.

In another embodiment, a method of detecting an anomaly in a power semiconductor device includes receiving, by a local component of a distributed system, data from one or more sensors positioned adjacent to the power semiconductor device. The data corresponds to one or more sensed properties of the power semiconductor device. The method further includes transmitting, by the local component of the distributed system, the data to a server computing device of the distributed system, which is remotely located from the local component. The method further includes processing, by the server computing device of the distributed system, the data through one or more of a machine learning algorithm, a fault diagnostic algorithm, and a fault prognostic algorithm, to generate a set of eigenvalues and associated eigenvectors, selecting, by the server computing device of the distributed system, a selected set of eigenvalues and associated eigenvectors, and statistically analyzing, by the local component of the distributed system, the selected set of eigenvalues and associated eigenvectors to determine whether the data is indicative of the anomaly.

In yet another embodiment, a method of detecting an anomaly in a power semiconductor device includes receiving, by a processing device, sensed data from one or more sensors positioned adjacent to the power semiconductor device. The sensed data corresponds to one or more sensed properties of the power semiconductor device. The method further includes transmitting, by the processing device, the sensed data to a server computing device that is remotely located from the processing device and receiving. By the processing device, processed data from the server computing device. The processed data comprises information generated as a result of an application of one or more of a machine learning algorithm, a fault diagnostic algorithm, and a fault prognostic algorithm to the sensed data. The method also includes statistically analyzing, by the processing device, the processed data to determine whether the sensed data is indicative of the anomaly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

The present disclosure relates generally to systems that incorporate a distributed architecture for fault monitoring. More specifically, certain tasks for obtaining data received from sensors coupled to power semiconductor devices, processing the data to determine whether the data is indicative of an anomaly, and taking a corrective action are split between a local device and a remote computing device. This division of the tasks allow for more processor-intensive tasks to be completed by the more powerful remote computing device while the remaining, less processor-intensive tasks are completed by a local computing device located in the vehicle. Such a division of the tasks further increases the speed in which anomalies can be detected and addressed so as to avoid device failure. This is because local processing of sensor data may generally yield a faster response to anomaly detection, remote processing of sensor data from multiple sources may yield richer information, better correlation, and a more thorough examination of larger datasets.

Figure 1:
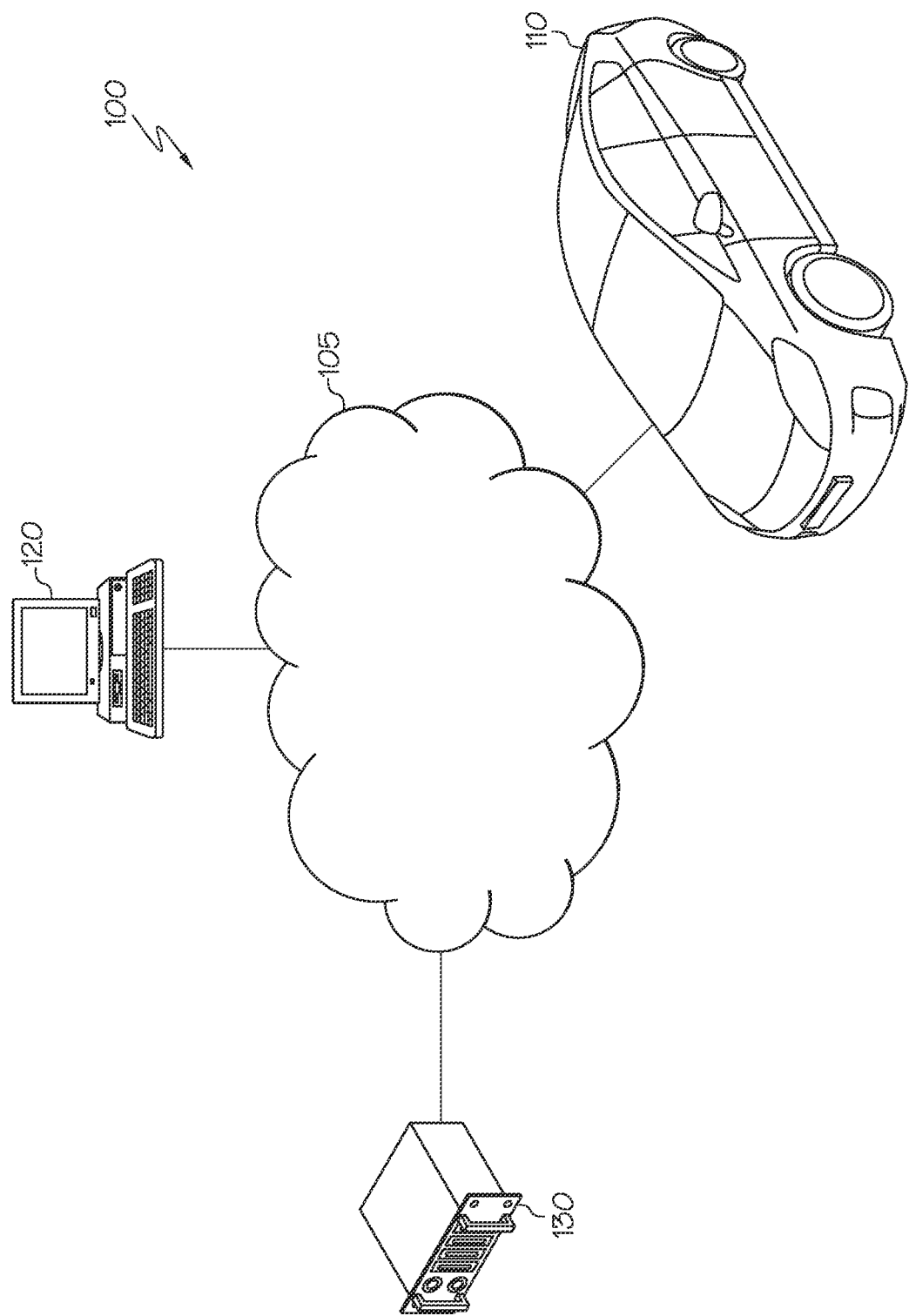
FIG. 1 schematically depicts an illustrative network having components for a distributed system for fault monitoring according to one or more embodiments shown and described herein.

Referring now to the drawings, FIG. 1 depicts an illustrative network 100 having components for a distributed fault monitoring architecture according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices and/or components thereof. Illustrative devices may include, but are not limited to, a vehicle 110, a user computing device 120, and a server computing device 130.

The vehicle 110 may generally be any vehicle with one or more onboard computing devices, particularly computing devices that contain hardware for processing data received from sensors positioned on or near power semiconductor devices located in the vehicle 110. In addition, the computing devices may contain hardware for providing an interface to a user of the vehicle 110, where the interface provides a notification if an anomaly is detected. It should be understood that while FIG. 1 only depicts a single vehicle 110 for the purposes of simplicity, the present disclosure is not limited to such. That is, the network 100 may include a plurality of vehicles 110 such that fault monitoring and anomaly detection can be completed substantially simultaneously for each of the plurality of vehicles 110.

It should be understood that the vehicle 110 is merely an illustrative example of a system that contains power semiconductor devices in need of monitoring according to the embodiments described herein. That is, other devices may be monitored in lieu of a vehicle without departing from the scope of the present disclosure. For example, devices such as robots, mobility systems (e.g., artificial intelligence devices, autonomous vehicle systems, etc.), manufacturing systems, utility systems (e.g., devices that are provided/utilized by a utility company to distribute utility services such as electrical power), and/or the like may also be a part of the distributed architecture described herein.

The user computing device 120 may generally be used as an interface between a user and the other components connected to the computer network 105. Thus, the user computing device 120 may be used to perform one or more user-facing functions, such as receiving one or more inputs from a user or providing information to the user, as described in greater detail herein. Accordingly, the user computing device 120 may include at least a display and/or input hardware, as described in greater detail herein. In the event that the server computing device 130 requires oversight, updating, and/or correction, the user computing device 120 may be configured to provide the desired oversight, updating, and/or correction. The user computing device 120 may also be used to input additional data into a corpus of data stored on the server computing device 130. For example, the user computing device 120 may contain software programming or the like that allows a user to view fault monitoring data, review anomalies that are detected in a plurality of vehicles (including vehicle 110), and provide information accordingly.

The server computing device 130 may receive data from one or more sources (e.g., the vehicle 110), analyze received data, generate data, store data, index data, search data, and/or provide data to the user computing device 120 and/or the vehicle 110 (or components thereof). More specifically, the server computing device 130 may employ one or more machine learning algorithms for the purposes of analyzing data that is received from the vehicle 110, as described in greater detail herein.

It should be understood that while the user computing device 120 is depicted as a personal computer and the server computing device 130 is depicted as a server, these are nonlimiting examples. In some embodiments, any type of computing device (e.g., mobile computing device, personal computer, server, cloud-based network of devices, etc.) may be used for any of these components. Additionally, while each of these computing devices is illustrated in FIG. 1 as a single piece of hardware, this is also merely an example. Each of the user computing device 120 and the server computing device 130 may represent a plurality of computers, servers, databases, components, and/or the like.

Figure 2A:
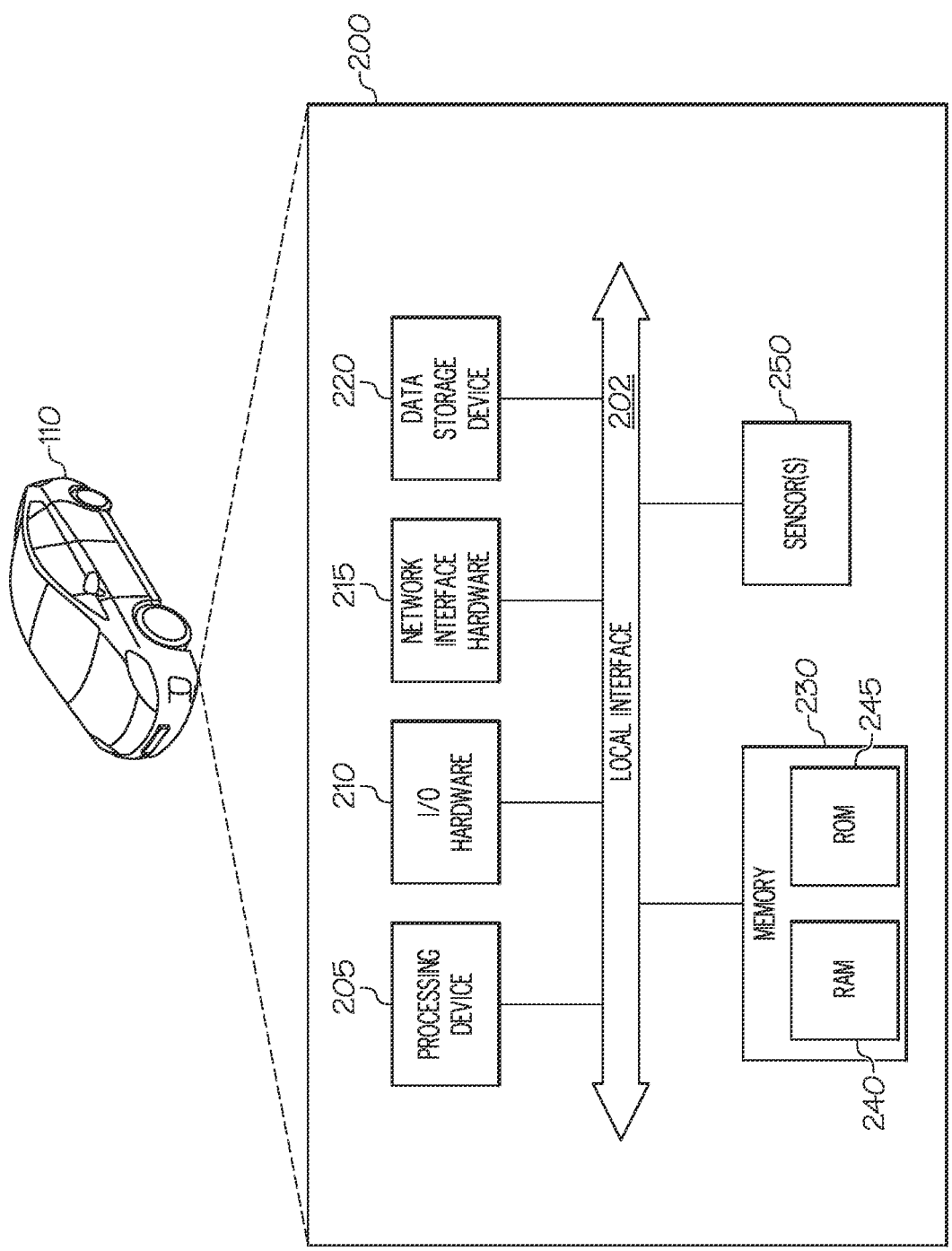
FIG. 2A schematically depicts illustrative hardware components of a vehicle used in a distributed system for fault monitoring according to one or more embodiments shown and described herein.

FIG. 2A schematically depicts illustrative hardware components of the vehicle 110 that may be used in monitoring power semiconductor devices and estimating anomalies.

The vehicle 110 may include a local component 200 (which may also be referred to as a vehicle component) having a non-transitory computer-readable medium for completing the various processes described herein, embodied as hardware, software, and/or firmware, according to embodiments shown and described herein. While in some embodiments the local component 200 may be configured as a general purpose computer with the requisite hardware, software, and/or firmware, in other embodiments, the local component 200 may also be configured as a special purpose computer designed specifically for performing the functionality described herein. In embodiments where the local component 200 is a general purpose computer, the methods described herein provide a mechanism for improving the functionality of the local component 200 by moving certain processor-intensive tasks away from the local component 200 to be completed by an external device that is more adapted for such tasks (e.g., the server computing device 130 of FIG. 1). Still referring to FIG. 2A, the local component 200 may generally be an onboard vehicle computing system. In some embodiments, the local component 200 may be a plurality of vehicle computing systems.

As also illustrated in FIG. 2A, the local component 200 may include a processing device 205, I/O hardware 210, network interface hardware 215, a data storage device 220, a non-transitory memory component 230, and one or more sensors 250. A local interface 202, such as a bus or the like, may interconnect the various components.

The processing device 205, such as a computer processing unit (CPU), may be the central processing unit of the local component 200, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 220 and/or the memory component 230).

The memory component 230 may be configured as a volatile and/or a nonvolatile computer-readable medium and, as such, may include random access memory 240 (including SRAM, DRAM, and/or other types of random access memory), read only memory (ROM) 245, flash memory, registers, compact discs (CD), digital versatile discs (DVD), and/or other types of storage components. The memory component 230 may include one or more programming instructions thereon that, when executed by the processing device 205, cause the processing device 205 to complete various processes, such as certain processes described herein with respect to FIG. 4A. Still referring to FIG. 2A, the programming instructions stored on the memory component 230 may be embodied as a plurality of software logic modules, where each logic module provides programming instructions for completing one or more tasks, as described in greater detail below with respect to FIG. 2B.

The network interface hardware 215 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 215 may provide a communications link between the vehicle 110 and the other components of the network 100 depicted in FIG. 1, including (but not limited to) the server computing device 130.

Still referring to FIG. 2A, the data storage device 220, which may generally be a storage medium, may contain one or more data repositories for storing data that is received and/or generated. The data storage device 220 may be any physical storage medium, including, but not limited to, a hard disk drive (HDD), memory, removable storage, and/or the like. While the data storage device 220 is depicted as a local device, it should be understood that the data storage device 220 may be a remote storage device, such as, for example, a server computing device or the like (e.g., the server computing device 130 of FIG. 1). Illustrative data that may be contained within the data storage device 220 is described below with respect to FIG. 2C.

Still referring to FIG. 2A, the I/O hardware 210 may communicate information between the local interface 202 and one or more other components of the vehicle 110. For example, the I/O hardware 210 may act as an interface between the local component 200 and other components, such as mobile phone systems, infotainment systems, and/or the like. In some embodiments, the I/O hardware 210 may be utilized to transmit one or more commands to the other components of the vehicle 110 based on one or more inputs received from a user via the other monitoring components.

The one or more sensors 250 may include various hardware components for sensing characteristics of certain vehicle components, particularly power semiconductor components. The one or more sensors 250 are otherwise not limited by the present disclosure. For example, the one or more sensors 250 may be electrical sensors, temperature sensors, and the like. Illustrative characteristics that may be sensed by the one or more sensors 250 include, but are not limited to, current, voltage, resistance, temperature, and the like. Each of the one or more sensors 250 may be positioned on, integrated with, positioned in line with, or positioned adjacent to one or more devices to be measured, such as power semiconductor components. The one or more sensors 250 may generally be configured to sense the one or more characteristics and transmit data corresponding to the one or more sensed characteristics, which is used to estimate anomalies and predict failure issues, as described in greater detail herein.

Figure 2B:
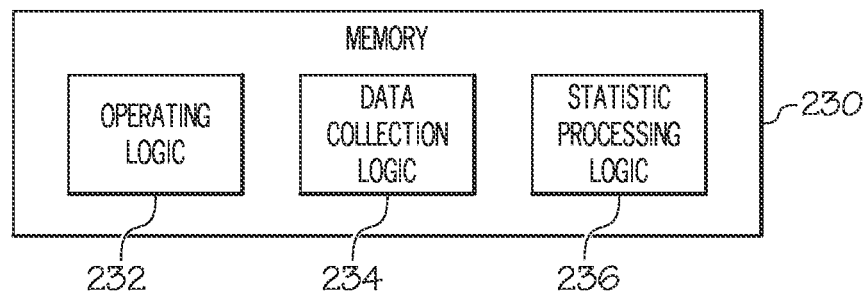
FIG. 2B schematically depicts an illustrative memory component of a vehicle, the memory component containing illustrative logic components according to one or more embodiments shown and described herein.

In some embodiments, the program instructions contained on the memory component 230 may be embodied as a plurality of software modules, where each module provides programming instructions for completing one or more tasks. For example, FIG. 2B schematically depicts the memory component 230 containing illustrative logic components according to one or more embodiments shown and described herein. As shown in FIG. 2B, the memory component 230 may be configured to store various processing logic, such as, for example, operating logic 232, data collection logic 234, and/or statistic processing logic 236 (each of which may be embodied as a computer program, firmware, or hardware, as an example). The operating logic 232 may include an operating system and/or other software for managing components of the local component 200 (FIG. 2A). The data collection logic 234 may contain one or more software modules for collecting data from one or more sources (e.g., the one or more sensors 250 depicted in FIG. 2A, the server computing device 130 depicted in FIG. 1, and/or the like), converting data, transmitting data, and/or analyzing data, as described in greater detail herein. The statistic processing logic 236 may contain one or more software modules for determining whether certain received data is indicative of an anomaly and/or whether a failure is likely, as described in greater detail herein.

Figure 2C:
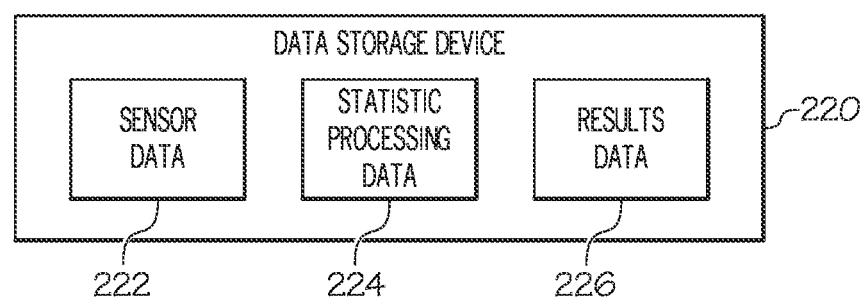
FIG. 2C schematically depicts an illustrative data storage device of a vehicle, the data storage device containing illustrative data components according to one or more embodiments shown and described herein.

FIG. 2C schematically depicts a block diagram of various data contained within a storage device (e.g., the data storage device 220) of the local component 200 (FIG. 2A) according to one or more embodiments shown and described herein. As shown in FIG. 2C, the data storage device 220 may include, for example, sensor data 222, statistic processing data 224, and/or results data 226. Sensor data 222 may include, for example, data received from the one or more sensors 250 (FIG. 2A). Statistic processing data 224 may generally be data that is generated and/or accessed as a result of processing data received from the one or more sensors 250 (FIG. 2A) and/or data received from the server computing device 130 (FIG. 1). Results data 226 may be data that corresponds to whether a particular anomaly is estimated or a fault is predicted, including time data, location data, transmission logs, and/or the like.

It should be understood that the components illustrated in FIGS. 2A-2C are merely illustrative and are not intended to limit the scope of this disclosure. More specifically, while the components in FIGS. 2A-2C are illustrated as residing within the local component 200 of the vehicle 110, this is a nonlimiting example. In some embodiments, one or more of the components may reside external to the local component 200 and/or the vehicle 110.

Figure 3A:
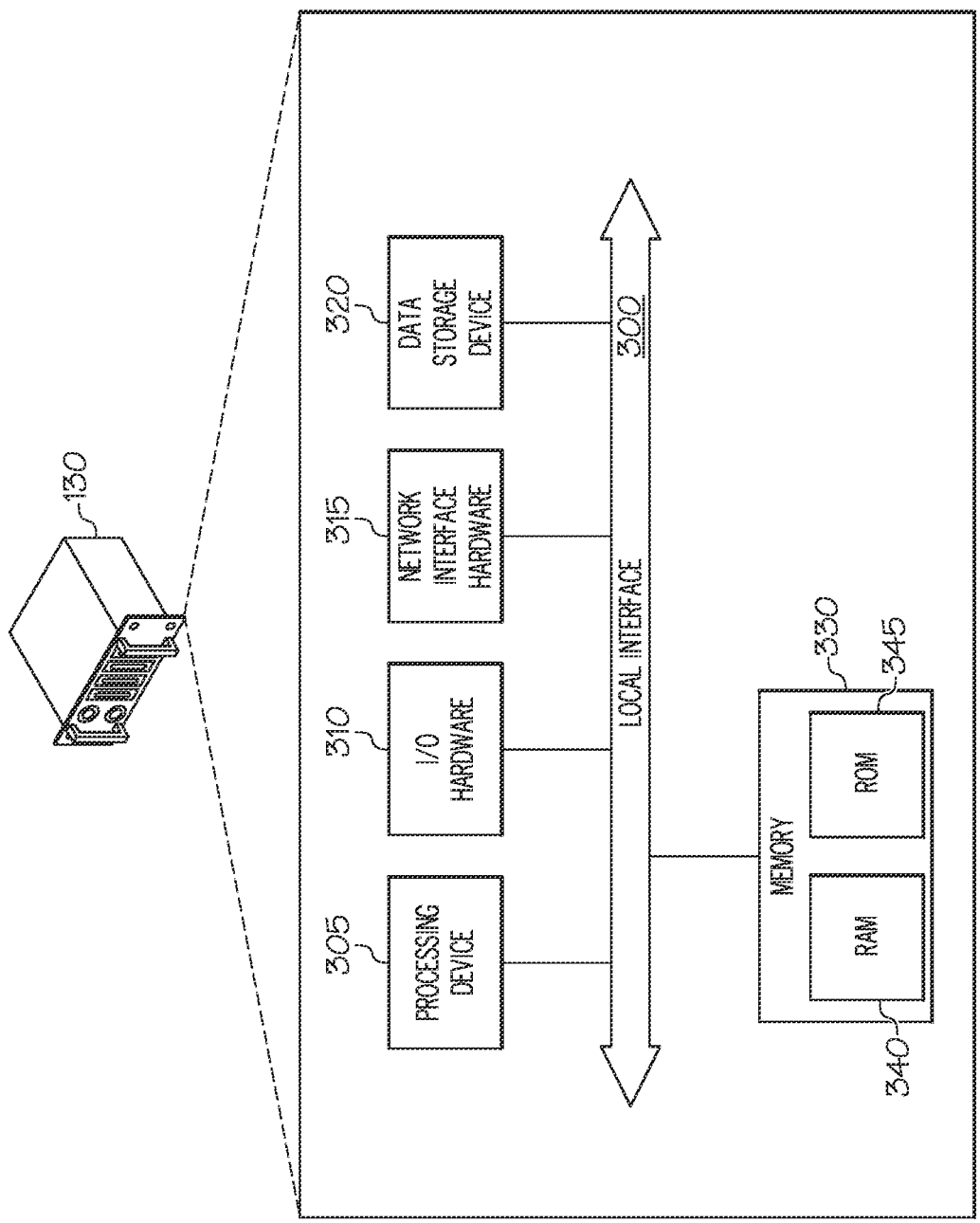
FIG. 3A schematically depicts illustrative hardware components of a server computing device used in a distributed system for fault monitoring according to one or more embodiments shown and described herein.

FIG. 3A schematically depicts illustrative hardware components of the server computing device 130 that may be used in monitoring power semiconductor devices and estimating anomalies.

The server computing device 130 may include a non-transitory computer-readable medium for completing the various processes described herein, embodied as hardware, software, and/or firmware, according to embodiments shown and described herein. While in some embodiments the server computing device 130 may be configured as a general purpose computer with the requisite hardware, software, and/or firmware, in other embodiments, the server computing device 130 may also be configured as a special purpose computer designed specifically for performing the functionality described herein. In embodiments where the server computing device 130 is a general purpose computer, the methods described herein provide a mechanism for improving the functionality of the server computing device 130 by moving certain less processor-intensive tasks away from the server computing device 130 to be completed by an external device (e.g., the local component 200 of FIG. 2A) that may be more adapted for such tasks so as to speed up the process of estimating anomalies and detecting potential failures, and to avoid having the server computing device 130 complete unnecessary computing tasks.

Still referring to FIG. 3A, the server computing device 130 may include a processing device 305, I/O hardware 310, network interface hardware 315, a data storage device 320, and a non-transitory memory component 330. A local interface 300, such as a bus or the like, may interconnect the various components.

The processing device 305, such as a computer processing unit (CPU), may be the central processing unit of the server computing device 130, performing calculations and logic operations to execute a program. The processing device 305, alone or in conjunction with the other components, is an illustrative processing device, computing device, processor, or combination thereof. The processing device 305 may include any processing component configured to receive and execute instructions (such as from the data storage device 320 and/or the memory component 330).

The memory component 330 may be configured as a volatile and/or a nonvolatile computer-readable medium and, as such, may include random access memory 340 (including SRAM, DRAM, and/or other types of random access memory), read only memory (ROM) 345, flash memory, registers, compact discs (CD), digital versatile discs (DVD), and/or other types of storage components. The memory component 330 may include one or more programming instructions thereon that, when executed by the processing device 305, cause the processing device 305 to complete various processes, such as certain processes described herein with respect to FIGS. 4A and 4B. Still referring to FIG. 3A, the programming instructions stored on the memory component 330 may be embodied as a plurality of software logic modules, where each logic module provides programming instructions for completing one or more tasks, as described in greater detail below with respect to FIG. 3B.

The network interface hardware 315 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 315 may provide a communications link between the server computing device 130 and the other components of the network 100 depicted in FIG. 1, including (but not limited to) the vehicle 110.

Still referring to FIG. 3A, the data storage device 320, which may generally be a storage medium, may contain one or more data repositories for storing data that is received and/or generated. The data storage device 320 may be any physical storage medium, including, but not limited to, a hard disk drive (HDD), memory, removable storage, and/or the like. While the data storage device 320 is depicted as a local device, it should be understood that the data storage device 320 may be a remote storage device, such as, for example, a server computing device or the like (e.g., the server computing device 130 of FIG. 1). Illustrative data that may be contained within the data storage device 320 is described below with respect to FIG. 3C.

Still referring to FIG. 3A, the I/O hardware 310 may communicate information between the local interface 300 and one or more other components of the server computing device 130. In some embodiments, the I/O hardware 310 may be utilized to transmit one or more commands to the other components of the server computing device 130 based on one or more inputs received from a user.

Figure 3B:
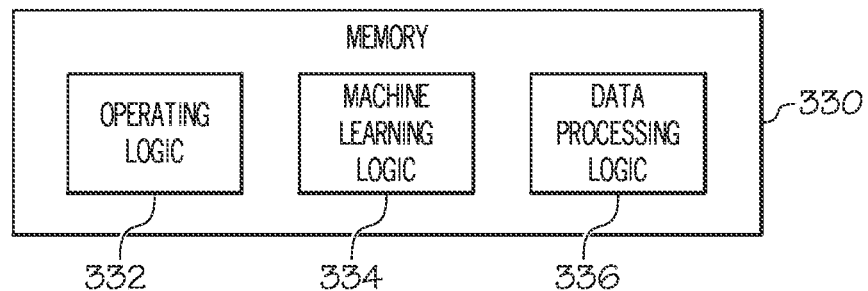
FIG. 3B schematically depicts an illustrative memory component of a server computing device, the memory component containing illustrative logic components according to one or more embodiments shown and described herein.

In some embodiments, the program instructions contained on the memory component 330 may be embodied as a plurality of software modules, where each module provides programming instructions for completing one or more tasks. For example, FIG. 3B schematically depicts the memory component 330 containing illustrative logic components according to one or more embodiments shown and described herein. As shown in FIG. 3B, the memory component 330 may be configured to store various processing logic, such as, for example, operating logic 332, machine learning logic 334, and/or data processing logic 336 (each of which may be embodied as a computer program, firmware, or hardware, as an example). The operating logic 332 may include an operating system and/or other software for managing components of the server computing device 130 (FIG. 3A). The machine learning logic 334 may contain one or more software modules for collecting data, analyzing data, and determining information from the data, as described in greater detail herein. The data processing logic 336 may contain one or more software modules for processing data that is received from the vehicle 110 (FIG. 1) (and/or the local component 200 of FIG. 2A) and returning the processed data (e.g., in the form of eigenvalues/eigenvectors) to the vehicle 110 (and/or the local component 200) for additional processing and a final determination, as described in greater detail herein.

Figure 3C:
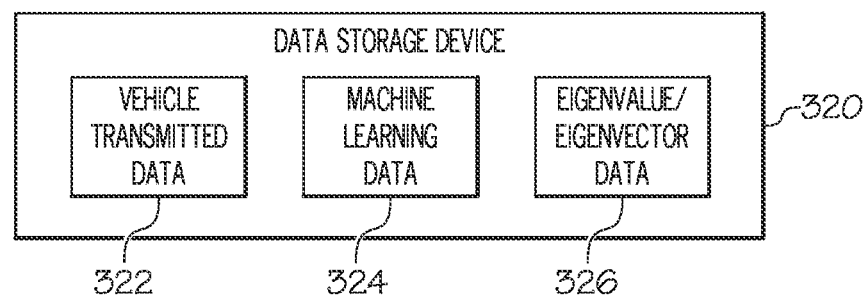
FIG. 3C schematically depicts an illustrative data storage device of a server computing device, the data storage device containing illustrative data components according to one or more embodiments shown and described herein.

FIG. 3C schematically depicts a block diagram of various data contained within a storage device (e.g., the data storage device 320) of the server computing device 130 (FIG. 3A) according to one or more embodiments shown and described herein. As shown in FIG. 3C, the data storage device 320 may include, for example, vehicle transmitted data 322, machine learning data 324, and/or eigenvalue/eigenvector data 326. Vehicle transmitted data 322 may include, for example, data received from the vehicle 110 (FIG. 1) and/or a component thereof (e.g., the local component 200 of FIG. 2A). The machine learning data 324 may generally be teaching data for machine learning processes and/or data that is used by machine learning to process additional received data. The eigenvalue/eigenvector data 326 may be data that is generated as a result of machine learning and outputted, as described in greater detail herein.

It should be understood that the components illustrated in FIGS. 3A-3C are merely illustrative and are not intended to limit the scope of this disclosure. More specifically, while the components in FIGS. 3A-3C are illustrated as residing within the server computing device 130, this is a nonlimiting example. In some embodiments, one or more of the components may reside external to the server computing device 130. Similarly, as previously described herein, while FIGS. 3A-3C are directed to the server computing device 130, other components such as the user computing device 120 may include similar hardware, software, and/or firmware.

As mentioned above, the various components described with respect to FIGS. 2A-2C and 3A-3C may be used to carry out one or more processes and/or provide functionality for receiving sensor data, processing the sensor data, and determining whether the processed sensor data is indicative of an anomaly and/or a potential device failure such that appropriate action can be undertaken. An illustrative example of the various processes is described with respect to FIGS. 4A-4B.

Figure 4A:
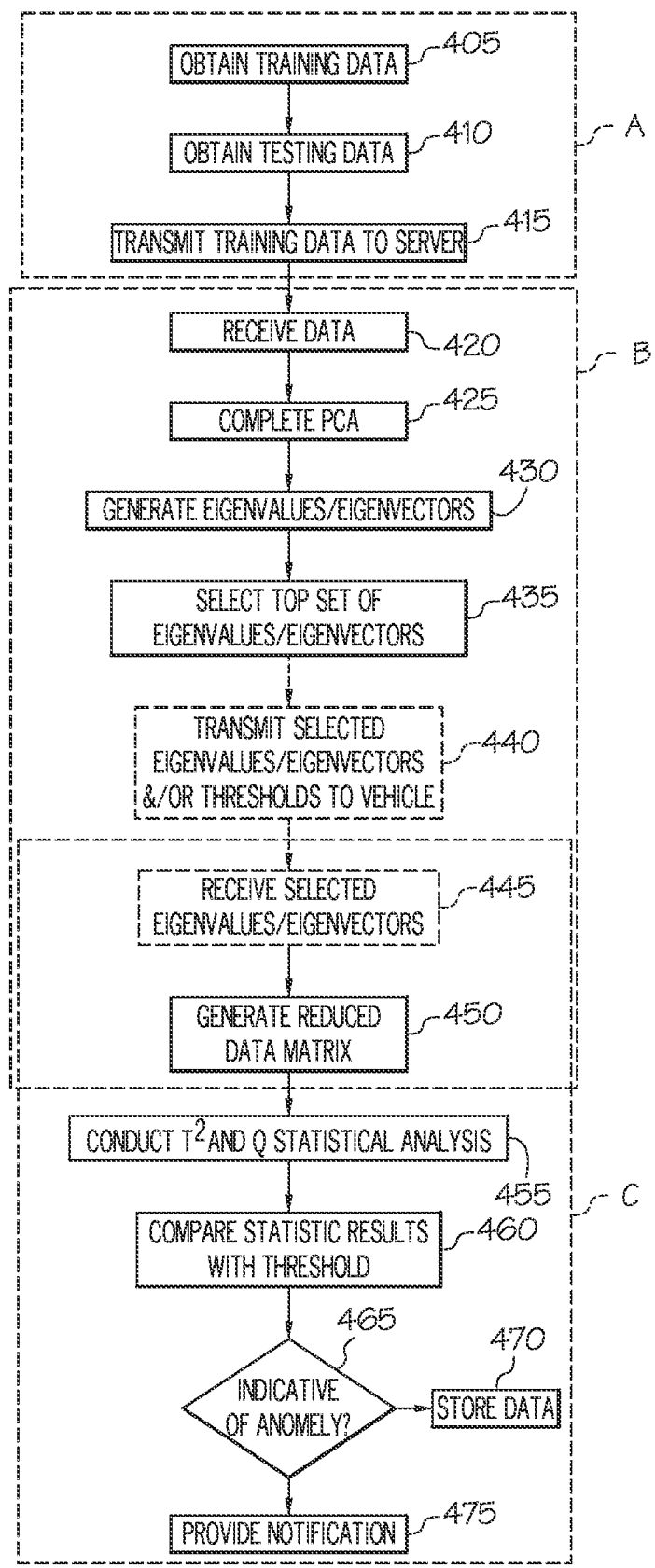
FIG. 4A schematically depicts a flow diagram of an illustrative method of conducting fault monitoring by a plurality of devices according to one or more embodiments shown and described herein.

FIG. 4A schematically depicts a flow diagram of an illustrative method of conducting fault monitoring by a plurality of devices. More specifically, a first portion A and a third portion B of the blocks depicted in FIG. 4A may be completed by the vehicle 110 (FIG. 1) and/or a component thereof (such as the local component 200 of FIG. 2A). A second portion B of the blocks depicted in FIG. 4A may be completed by the server computing device 130 (FIG. 1). As indicated by the dashed line boxes, blocks 405, 410, and 415 are within the first portion A, blocks 420, 425, 430, 435, and 440 are within the second portion B, and blocks 455, 460, 465, 470, and 475 are within the third portion C. In some embodiments, blocks 445 and 450 may be within the second portion B. In other embodiments, blocks 445 and 450 may be within the third portion C. As such, blocks 440 and 445 may be optional depending on where the processing occurs, as described hereinbelow. The division of the various processes into the first portion A, the second portion B, and the third portion C may allow for certain computationally expensive processes (i.e., the processes of the second portion B) to be completed by the more powerful server computing device 130 (FIG. 1), particularly in instances where the server computing device 130 receives data from a plurality of vehicles (e.g., an entire fleet of vehicles). In addition, the division of the various processes into the first portion A, the second portion B, and the third portion C allows for less computationally expensive processes (i.e., the processes of the first portion A and the third portion C) to be completed by each individual vehicle 110 (FIG. 1) communicatively coupled to the server computing device 130, particularly such that the processes can be quickly completed by the local component 200 (FIG. 2A) of each individual vehicle 110 (FIG. 1) so that anomalies can be detected as soon as possible without having to wait an extended period of time for the server computing device 130 to complete the processes.

Still referring to FIG. 4A, training data may be received at block 405 and testing data may be received at block 410. The training data and the testing data may generally be the data that is received from the one or more sensors positioned on, integrated with, positioned in line with, or positioned adjacent to one or more devices to be measured, such as power semiconductor components of the vehicle. As such, the training data and the testing data may be collectively referred to herein as sensed data. In some embodiments, the training data and the testing data may generally be the same data. That is, the data that is received from the sensors is split up, with one portion of the data being designated as the training data and the other portion being designated as the testing data. For example, about 60% of the data, about 70% of the data, about 80% of the data, about 90% of the data, or the like may be designated as training data and the remaining portion of the data designated as the testing data. Other percentages should generally be understood without departing from the scope of the present disclosure. The training data may generally refer to data that is used for the purposes of creating and/or updating a machine learning model that, whereas the testing data refers to data that is used, based on the machine learning model, to determine whether an anomaly exists, predict potential issues, and/or the like.

The training data may then be transmitted from the vehicle to the server computing device at block 415. For example, the training data may be wirelessly transmitted from the vehicle to the server computing device.

Figure 4B:
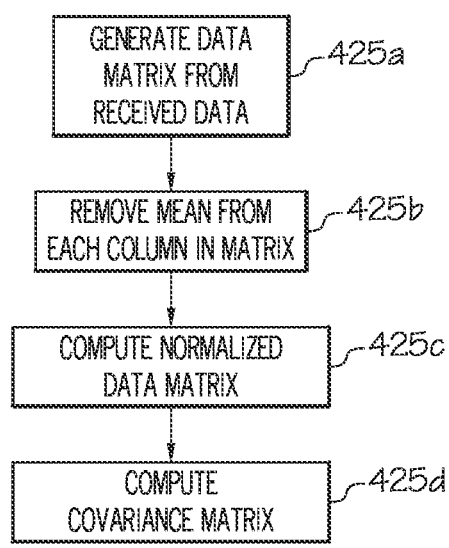
FIG. 4B schematically depicts a flow diagram of an illustrative machine learning method according to one or more embodiments shown and described herein.

At block 420, the server computing device may receive the data and complete a machine learning algorithm to build and/or update a machine learning model. For example, at block 425, the computing device may utilize principal component analysis (PCA) to build and/or update the machine learning model. FIG. 4B depicts particular processes that are completed as part of the PCA completion step at block 425.

At block 425a, a data matrix is generated from the data that is received. The data matrix may generally include each type of data that has been received from the one or more sensors and transmitted to the server computing device. For example, Table 1 below depicts illustrative types of data that may be received and arranged into a data matrix according to block 425a:

TABLE 1

Illustrative data collected from sensor(s)

| | | |
|---|---|---|
| Cycling_Current | Delta_temp | Normalized_RthJA |
| Power-step | Tj_max_hot | Tj_min_cold |
| Vcold_Measurement | Vhot_measurement | Von_Cycling |

The data in Table 1 above includes a device cycling current, a change in device temperature, a normalized junction-to-ambient thermal resistance, a power step, a device maximum junction temperature, a device minimum junction temperature, a Vcold measurement, a Vhot measurement, and a Von measurement. It should be understood that the data included in Table 1 is merely illustrative, and the data matrix may be generated from other types of data, fewer data types, or more data types without departing from the scope of the present disclosure. One illustrative example of matrix generation may include the following: suppose there are a number of measurements (e.g., three measurements: Cycling current, Von cycling voltage and Delta Temperature), and each measurement has a number of data samples (e.g., 2000). The measured data is organized as a matrix X, an N by p matrix, where N=2000 is number of data sample and p=3 is Number of features (e.g., attributes, measurements).

At block 425b, the mean from each column in the data matrix may be such that a normalized data matrix can be computed at block 425c. As such, the new, normalized matrix may reflect data that is on the same scale. That is, certain data received from a sensor may be on a larger scale than other data received from another sensor (e.g., first data may be on a first order of magnitude that is greater than second data on a second order of magnitude). Normalizing the data ensures that all of the data is on the same magnitude. Put another way, since the features have different ranges of values, the variabilities of the features may be difficult to observe. Therefore, the mean of each feature may be removed to adjust all the features into similar ranges. One illustrative example of matrix normalization may include computing the mean of each column feature according to Equation (1) below and removing the mean from each column to form a new data matrix $X_1$ according to Equation (2) below:

$$\underline{m} = \frac{X^T \underline{e}}{N}; \underline{e} \sim N \text{ column vector of } 1^s \qquad (1)$$

$$X_1 = X - \underline{em}^T = \left(I - \frac{\underline{ee}^T}{N}\right)X \qquad (2)$$

where $\underline{e}$ is an N column matrix of all ones, $\underline{m}$ is a vector of mean values, X is the original data matrix, and $X_1$ is a removed mean data matrix.

At block 425d, a covariance matrix may be computed. That is, the variants of each of the data points is calculated and placed into matrix form. The covariance matrix P generalizes the notion of variance to p=3 dimensions. Accordingly, the p by p (here, a 3 by 3) covariance matrix of data matrix $X_1$ described above is computed according to Equation (3) below, for example:

$$P = X_1^T X_1 \qquad (3)$$

Referring again to FIG. 4A, Eigenvalues and Eigenvectors may be generated from the covariance matrix at block 430 and the top set of Eigenvalues and Eigenvectors may be selected at block 435. For example, Eigen decomposition of the covariance matrix P may be performed and the Eigen vectors corresponding to the top k eigenvalues Equation (4) below:

$$\frac{\sum_{i=1}^{k} \lambda_i}{\text{trace}(P)} > Th \ (0.95)$$

$$P = V\Lambda V^T; \lambda_1 \geq \lambda_2 \geq \cdots \geq \lambda_k \geq \lambda_{k+1} \geq \cdots \geq \lambda_p \qquad (4)$$

If k=2 satisfies Equation (4), the top 2 Eigenvalues and the corresponding Eigenvectors represent the most variability of all the data. As such, the top 2 Eigenvalues and the corresponding Eigenvectors may be selected. It should be understood that the top Eigenvalues that are selected represent the most variability in the data that was received by the sensors. In addition, it should be understood that more variability in the data that was received by the sensors is the most valuable for the purposes of extracting information therefrom and determining whether an anomaly exists for the purposes of predicting potential failures.

It should be understood that the processes described herein with respect to blocks 425 (including blocks 425a-425d of FIG. 4B), 430, and 435 may be part of a PCA analysis. However, the present disclosure is not limited to such an analysis. Other machine learning analyses that are used for the purposes of generating and/or updating a model may also be used without departing from the scope of the present disclosure. In addition, a fault diagnostic algorithm and/or a fault prognostic algorithm may also be used without departing from the scope of the present disclosure. It should be understood that a fault diagnostic algorithm may generally be programming that is used to determine failure characteristics of a device and provide information that may be used to improve or repair a power semiconductor device. It should also be understood that a fault prognostic algorithm may generally be programming that analyzes detected changes in system states to predict failures, determine whether the changes are indicative of wear and aging, and/or determine whether the changes are indicative of fault conditions.

In embodiments where the remaining of the processes described in FIG. 4A (i.e., blocks 450-475) are completed by each individual vehicle, the data containing the selected eigenvalues and eigenvectors (e.g. processed data) and/or thresholds may be transmitted to each vehicle at block 440 and received by each vehicle at block 445 such that the vehicle can complete the process described hereinbelow with respect to block 450. However, it should be understood that these processes are optional. In other embodiments, the data may not be transmitted to each vehicle, but rather may be retained by the server computing device for the purposes of completing the processes depicted at block 450, as described herein. The results of the processes completed according to block 450 (which may also be considered processed data in some contexts) may then be transmitted to each vehicle for additional processing, as described in greater detail herein with respect to blocks 455-475.

At block 450, a reduced data matrix or indicator $X_2$ may be generated from the received data. For example, the matrix $X_1$ can be simplified by multiplying the top 2 Eigenvectors. Equation (5) below may be used to calculate the reduced data matrix, where $V_k$ is a p=3 by k=2 matrix corresponding to the first 2 columns of V. The N=2000 by k=2 normalized principal component (PC) matrix is given by Equation (6) below:

$$X_2 = X_1 V_k \qquad (5)$$

$$Y = X_2 \Lambda_k^{-1/2} \qquad (6)$$

In addition, the N by p residual matrix, R and its p by p covariance matrix, $\Sigma_r$, may computed by Equation (7) below. The trend of residual may be used to distinguish failure types and data error when an anomaly occurs.

$$R = X_1[I_p - V_k V_k^T]$$

$$\Sigma_r = [I_p - V_k V_k^T]P[I_p - V_k V_k^T] \qquad (7)$$

At block 455, the vehicle (e.g., the local component) may conduct a $T^2$ and Q statistical analysis of the resultant data to detect anomalies. More specifically, Hotelling's $T^2$-statistic may be used as an anomaly detector as depicted in Equation (8) below:

$$T^2(i) = \underline{x}_2^T(i)\Lambda T_k^{-1}\underline{x}_2(i) = \underline{y}^T(i)\underline{y}(i); i=1,2,\ldots,N \qquad (8)$$

where $\underline{x}_2^T$ is the $i^{th}$ row of $X_2$ matrix and $\underline{y}^T$ OD is the $i^{th}$ row of Y. Here, $$T^2 \sim \frac{k(N-1)}{N-k} F_{k,N} \sim \chi_k^2$$

for large N where $F_{k,N}$ is the Fisher F-distribution with k and (N–k) degrees of freedom. The $\lambda_k^2$ is the chi-squared distribution with k degrees of freedom. The threshold for $T^2$-statistic is from the Chi-square distribution table based on the degrees of freedom and level of significance. Since the top 2 eigenvalues are selected, the degree of freedom is 2, and if 1% level of significance is selected, it means the values below the selected threshold has 99% confidence to follow chi-squared distribution.

In addition, the Q-statistic can be used as model validity checker and the second anomaly detector. The Q-statistic may be computed by Equation (9) below:

$$Q(i) = \underline{x}_1^T(i)[I_p - V_k V_k^T]\underline{x}_1(i); i=1,2,\ldots,N \quad (9)$$

where $\underline{x}_1^T$ is the $i^{th}$ row of $X_1$ matrix and $$Q \sim \sum_{i=k+1}^{p} \lambda_i z_i^2; z_i^2 \sim \chi_1^2.$$

The Q-Statistic may generally be the sums of squares of the residuals for an observation vector after being fitted by the first k principal components. The Q-statistic is also a weighted combination of (p–k) chi-squared random variables where the weights are the (p–k) neglected Eigenvalues of the covariance matrix.

Figure 5:
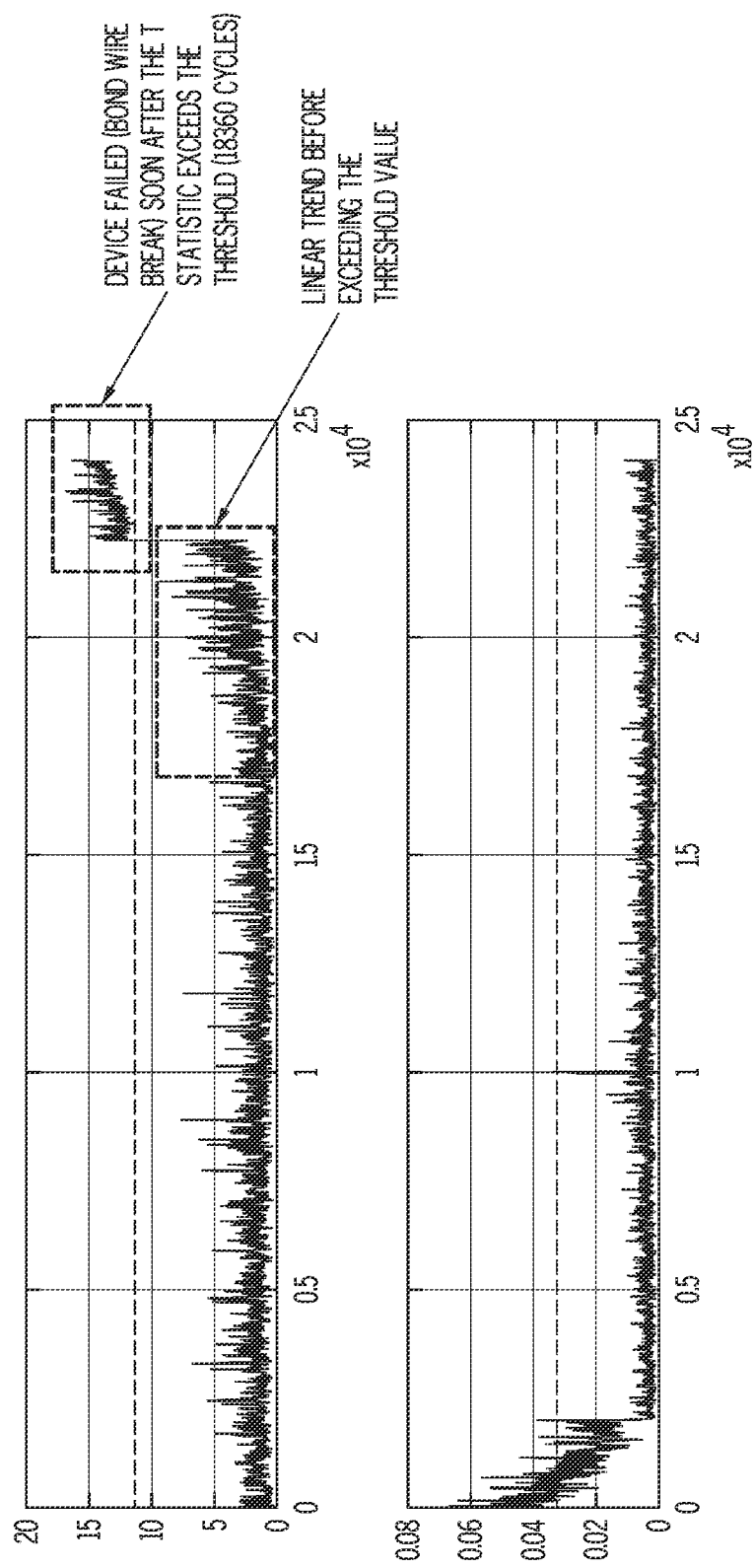
FIG. 5 graphically depicts an illustrative $T^2$ and Q statistical plots over a period of time according to one or more embodiments shown and described herein.

At block 460, the results of the $T^2$ and Q statistical analysis are compared with a threshold to determine at block 465 whether an anomaly exists. For example, if the results of the analysis are above a threshold and/or trending toward a threshold, an anomaly may be determined. If the results of the analysis are below a threshold and/or are not trending toward a threshold, no anomaly may be determined. For example, as shown in FIG. 5, the threshold may be about 18,360 cycles. When the results of the analysis exceed the threshold, it may be determined that a failure is likely to happen. As such, when the results start trending towards the threshold, an anomaly may be determined in some embodiments.

Referring again to FIG. 4A, if the data is not indicative of an anomaly, data may be stored at block 470 for future reference, but no action may be taken at that time. In contrast, if the data is indicative of an anomaly, a notification may be provided at block 475 and/or one or more other actions may be completed to address the issue before a failure occurs. For example, a notification may be provided to a user of the vehicle via a user interface, a notification may be provided to a repair facility, a notification may be provided to a manufacturer, and/or the like.

It should now be understood that the present disclosure relates to systems that incorporate a distributed architecture for fault monitoring in a plurality of devices that are coupled to a remote server computing device. The plurality of devices, such as vehicles, robots, mobility systems, manufacturing systems, utility systems, and the like, may include one or more power semiconductor devices and/or that are monitored via sensors for detecting fault potential before a fault occurs. Since monitoring such devices requires computationally expensive processing, the remote server computing device may complete such processing, leaving less computationally expensive processing to be completed by the each of the plurality of devices themselves such that anomaly detection can occur more quickly and an action can be taken before a fault occurs.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A distributed architecture system, comprising:
a power semiconductor device that, during a course of operation, exhibits properties comprising a device cycling current, a change in device temperature, a normalized junction-to-ambient thermal resistance, a power step, a device maximum junction temperature, a device minimum junction temperature, a Vcold measurement, a Vhot measurement, and a Von measurement; and
a local component comprising one or more sensors positioned adjacent to the power semiconductor device for sensing one or more of the properties of the power semiconductor device and generating sensed data corresponding thereto, wherein the local component designates a first portion of the sensed data as testing data and designates a second portion of the sensed data as training data, transmits the training data to a server and retains the testing data, receives a selected set of eigenvalues and associated eigenvectors generated by the server based on the properties, and conducts a statistical analysis of the selected set of eigenvalues and associated eigenvectors to determine that the testing data is indicative of an anomaly.

2. The distributed architecture system of claim 1, wherein the local component further generates a reduced data matrix from the selected set of eigenvalues and associated eigenvectors and conducts the statistical analysis from the reduced data matrix.

3. The distributed architecture system of claim 1, wherein the local component conducts the statistical analysis from a reduced data matrix generated by the server from the selected set of eigenvalues and associated eigenvectors.

4. The distributed architecture system of claim 1, wherein the selected set of eigenvalues and associated eigenvectors are generated using one or more of a machine learning algorithm, a fault diagnostic algorithm, and a fault prognostic algorithm.

5. The distributed architecture system of claim 1, wherein the selected set of eigenvalues and associated eigenvectors are generated using a principal component analysis algorithm.

6. The distributed architecture system of claim 1, wherein the local component determines that the testing data is indicative of the anomaly when the statistical analysis indicates a trend towards a threshold.

7. The distributed architecture system of claim 1, wherein the local component and the one or more sensors are located in a vehicle, a robot, a mobility system, a manufacturing system, or a utility system.

8. The distributed architecture system of claim 1, wherein the statistical analysis is a $T^2$ and Q statistical analysis.

9. The distributed architecture system of claim 1, wherein the local component conducts the statistical analysis from a reduced data matrix generated by the server from the selected set of eigenvalues and associated eigenvectors.

10. A method of detecting an anomaly in a power semiconductor device, the method comprising:
  receiving sensed data from one or more sensors positioned adjacent to the power semiconductor device, the sensed data corresponding to sensed properties of the power semiconductor device comprising one or more of a device cycling current, a change in device temperature, a normalized junction-to-ambient thermal resistance, a power step, a device maximum junction temperature, a device minimum junction temperature, a Vcold measurement, a Vhot measurement, and a Von measurement;
  designating a first portion of the sensed data as testing data and a second portion of the sensed data as training data;
  transmitting the training data to a server that is remotely located from the processing device and retaining the testing data;
  receiving processed data from the server, the processed data comprising information generated as a result of an application of an algorithm to the sensed data; and
  statistically analyzing the processed data to determine whether the retained testing data is indicative of the anomaly.

11. The method of claim 10, wherein receiving the processed data comprises receiving a selected set of eigenvalues and associated eigenvectors based on the properties from the server.

12. The method of claim 11, further comprising:
  generating a reduced data matrix from the selected set of eigenvalues and associated eigenvectors.

13. The method of claim 12, wherein statistically analyzing the processed data comprises analyzing the reduced data matrix to determine whether the testing data is indicative of the anomaly.

14. The method of claim 11, wherein the selected set of eigenvalues and associated eigenvectors are generated using one or more of a machine learning algorithm, a fault diagnostic algorithm, a the fault prognostic algorithm.

15. The method of claim 11, wherein the selected set of eigenvalues and associated eigenvectors are generated using a principal component analysis algorithm.

16. The method of claim 11, wherein statistically analyzing the selected set of eigenvalues and associated eigenvectors to determine whether the testing data is indicative of the anomaly comprises determining whether statistical analysis results indicate a trend towards a threshold.

17. The method of claim 10, further comprising:
  receiving a reduced data matrix generated by the server.

18. A distributed architecture system, comprising:
  a power semiconductor device that, during a course of operation, exhibits properties comprising a device cycling current, a change in device temperature, a normalized junction-to-ambient thermal resistance, a power step, a device maximum junction temperature, a device minimum junction temperature, a Vcold measurement, a Vhot measurement, and a Von measurement;
  a local component comprising one or more sensors positioned adjacent to the power semiconductor device for sensing one or more of the properties of the power semiconductor device and generating sensed data corresponding thereto; and
  a server communicatively coupled to the local component,
  wherein:
    the local component:
      designates a first portion of the sensed data as testing data and designates a second portion of the sensed data as training data, and
      transmits the training data to the server and retains the testing data,
    the server:
      generates a set of eigenvalues and associated eigenvectors based on the properties by applying one or more of a machine learning algorithm, a fault diagnostic algorithm, and a fault prognostic algorithm to the training data, and
      selects a selected set of eigenvalues and associated eigenvectors, and
    the local component conducts a statistical analysis of the selected set of eigenvalues and associated eigenvectors to determine that the testing data is indicative of the anomaly.

19. The distributed architecture system of claim 18, wherein the one or more of the machine learning algorithm, the fault diagnostic algorithm, and the fault prognostic algorithm is a principal component analysis algorithm.

20. The distributed architecture system of claim 18, wherein the local component further generates a reduced data matrix from the selected set of eigenvalues and associated eigenvectors and conducts the statistical analysis from the reduced data matrix.

* * * * *

UNITED STATES PATENT AND TRADEMARK OFFICE
CERTIFICATE OF CORRECTION

| | |
|---|---|
| PATENT NO. | : 11,573,877 B2 |
| APPLICATION NO. | : 17/378230 |
| DATED | : February 7, 2023 |
| INVENTOR(S) | : Ercan M. Dede et al. |

It is certified that error appears in the above-identified patent and that said Letters Patent is hereby corrected as shown below:

In the Claims

In Column 15, Line 43, Claim 14, delete "a the" and insert --and a--, therefor.

Signed and Sealed this
Twenty-first Day of March, 2023

*Katherine Kelly Vidal*

Katherine Kelly Vidal
*Director of the United States Patent and Trademark Office*